United States Patent [19]

Bührmann et al.

[11] Patent Number: 4,643,403
[45] Date of Patent: Feb. 17, 1987

[54] LIQUID-COOLED LANCE FOR BLOWING OXYGEN ONTO A STEEL BATH AND METHOD OF OPERATING THE LANCE

[75] Inventors: Gerardus P. Bührmann, Velsen-Zuid; Pieter J. Kreijger, Castricum, both of Netherlands

[73] Assignee: Hoogovens Groep B.V., IJmuiden, Netherlands

[21] Appl. No.: 697,905

[22] Filed: Feb. 4, 1985

[30] Foreign Application Priority Data

Feb. 8, 1984 [NL] Netherlands ............... 8400393

[51] Int. Cl.$^4$ ............................................. C21C 5/32
[52] U.S. Cl. ................................. 266/225; 75/59.23; 239/132.3; 266/270
[58] Field of Search ............... 266/47, 225, 266, 270; 239/132.3; 75/59.23

[56] References Cited

U.S. PATENT DOCUMENTS

| | | | |
|---|---|---|---|
| 2,878,115 | 3/1959 | Schane, Jr. et al. | 266/225 |
| 3,488,044 | 1/1970 | Shepherd | 239/132.3 |
| 4,427,186 | 1/1984 | Bührmann | 266/270 |

FOREIGN PATENT DOCUMENTS 934112 8/1963 United Kingdom .

*Primary Examiner*—L. Dewayne Rutledge
*Assistant Examiner*—Robert L. McDowell
*Attorney, Agent, or Firm*—Stevens, Davis, Miller & Mosher

[57] ABSTRACT

A liquid-cooled lance for blowing oxygen onto a bath of molten steel, has a tip (1) with at least one outlet from which a primary supply of oxygen is blown onto the bath, a central duct (2) for the supply of the primary oxygen surrounded by a double tube system (3,4) for supply and removal of cooling fluid, a plurality of secondary outlets (15) disposed around the lance in a conical widening of the lance axially spaced from the tip for blowing a secondary supply of oxygen and a plurality of secondary ducts (8, 9) extending along the lance for supply of the secondary oxygen to the secondary outlets. To obtain a high maximum possible scrap addition, and good control of final oxygen blowing temperature, there are at least eight of the secondary outlets (15) each having a diameter $d_s$ which satisfies the condition $d_s/1 < 0.02$ where 1 is the axial distance between the outlets for respectively the primary and secondary oxygen.

7 Claims, 5 Drawing Figures

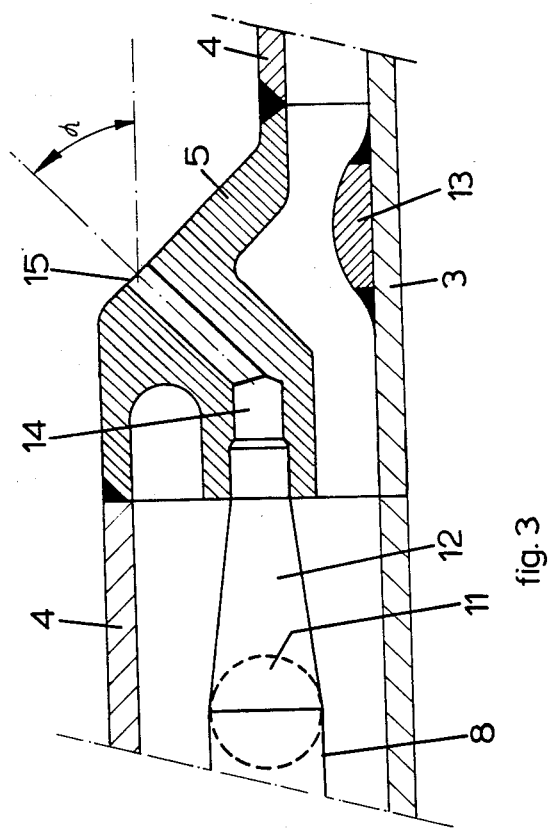
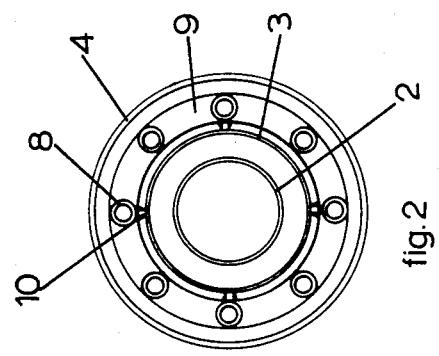

LIQUID-COOLED LANCE FOR BLOWING OXYGEN ONTO A STEEL BATH AND METHOD OF OPERATING THE LANCE

BACKGROUND OF THE INVENTION

1. Field of the invention

The invention relates to a liquid-cooled lance for blowing oxygen onto a steel bath for the purpose of refining it, and to a method of operating such a lance in a steel-making process. In particular, the invention relates to a liquid-cooled lance for blowing oxygen onto a bath of molten steel, having a tip with at least one outlet from which a primary supply of oxygen is blown onto the bath, a central duct for the supply of the primary oxygen surrounded by a double tube system for supply and removal of cooling fluid, a plurality of secondary outlets disposed around the lance in a conical widening of the lance axially spaced from the tip for blowing a secondary supply of oxygen and a plurality of secondary supply ducts extending along the lance for supply of the second oxygen to the secondary outlets.

2. Description of the prior art

U.S. Pat. No. 4,427,186 discloses a lance of the type described above. Another example of a lance which has secondary oxygen outlets (at least eight in number) is disclosed in GB-A-934112 but in this case the secondary outlets are all supplied from a single duct extending along the lance. U.S. Pat. No. 3,488,044 similarly shows four secondary oxygen outlets supplied via a single axially extending duct.

In steel-refining, the starting materials are often a mixture of liquid pig iron and scrap. The quantity of scrap which can be added, i.e. the scrap addition or scrap rate, is dependent among other things on the temperature of the liquid pig iron and on the quantity of heat evolved in the converter by the conversion of carbon into CO or $CO_2$. The more $CO_2$ is formed, the more heat is evolved, so that the scrap addition can be increased.

In some cases it can be an advantage to combine the steel process with an injection of gas through the bottom of the vessel into the liquid steel. For instance a better stirring effect is achieved thereby. Such a step may however cause a cooling of the bath, which reduces the amount of scrap which can be added. Particularly when the price of scrap is low it is desirable to have high flexibility to increase the amount of scrap added in the steel manufacture process. By making use of the secondary oxygen supply mentioned above, it is possible to supply extra heat to the bath so that extra scrap can be added and melted.

SUMMARY OF THE INVENTION

It has now been realised that this extra possible scrap addition, when supplying secondary oxygen, is dependent on the distance between the outlets respectively for the primary and secondary oxygen, and may also depend on the height of the lance head above the bath surface during operation. However, it also appears that for the distance between the outlets for respectively primary and secondary oxygen at which the maximum scrap addition can be obtained, there is a minimum degree of control of the final temperature of the blowing process. This expresses itself as a maximum in the standard deviation $\sigma T$ of this final temperature, for a number of successive charges. Since the result of this is that the tapping temperature is also difficult to control, this is an undesirable circumstance.

The object of the present invention is to provide a lance, of the type set out initially, by means of which extra heat can be supplied to the bath for melting of the scrap, while nevertheless good control of the final temperature of the blowing process can be achieved.

The invention consists in that at least eight outlets for secondary oxygen are provided, each with a diameter $d_s$ which satisfies the condition $d_s/1 < 0.02$, where 1 is the axial distance between the outlets for respectively primary and secondary oxygen. It appears that the control of the final temperature is strongly dependent on the reproducibility of the flow pattern of secondary oxygen within the steel converter, and that this reproducibility is in turn improved by ensuring that the jet cone of the secondary oxygen which leaves the secondary oxygen outlets is sufficiently stable. This is analogous to the experience obtained with blowing of primary oxygen, where it has been found also that the stability of the jet cone has a strong influence on the reproducibility of the oxidation reactions, and thus on the predictability of the final conditions of the blowing process. If $d_s$ satisfies the condition stated above, not only is a stable secondary oxygen jet cone obtained, but this has also the consequence that the oxidation reactions are reproducible and that the heat released is taken up by the bath in a predictable manner.

Preferably the lance has more than 12, and more preferably 15 to 20, outlets for secondary oxygen, each with a diameter $d_s$ which satisfies the condition $d_s/d_k \leq 0.3$ where $d_k$ is the diameter of the narrowest opening of the outlets for primary oxygen (e.g. the diameter of the opening for primary oxygen in the case where there is only one).

In U.S. Pat. No. 4,427,186, it is stated that extra measures are desirable in the construction of the lance to allow for differences in thermal expansion of different parts of the lance as well as temperature changes during operation. It was recommended there that the supply ducts for the secondary oxygen should have a helical shape over at least part of their axial length. These ducts are then wound around the inner wall of the double tube system for the coolant. This may lead to problems if the number of outlets for secondary oxygen is higher than shown there, when each outlet has its own supply duct. However, this possible constructional difficulty can be over come if a plurality of outlets for the secondary oxygen are connected to each secondary supply duct.

A further improvement in the stability of the secondary oxygen jet cone can be obtained if the secondary supply outlets have exit nozzles which have at least generally the shape of Laval nozzles.

In the use of the lance of the invention, to blow oxygen onto a steel bath, a good combination of an improved scrap addition and an improved control of the final temperature may be obtained if the said distance 1 between the outlets for respectively primary and secondary oxygen is in the range 0.2 to 0.8 times, and preferably in the range 0.3 to 0.45 times, the lance-bath surface spacing during the main decarburisation period of the steel bath.

BRIEF DESCRIPTION OF THE DRAWINGS

A preferred embodiment of the invention will be described below by way of non-limitative example with reference to the accompanying drawings, in which:

FIG. 2 is a cross section at II—II of FIG. 1, FIG. 3 shows a detail of FIG. 1 near the outlet of a secondary supply conduit.

FIG. 1 shows a water-cooled oxygen lance embodying the invention, in side view on one side of the central axial line of the lance, and in longitudinal section on the other side. The lance has a lance tip or head 1 of a customary type with three primary oxygen outlet holes illustrated. Primary oxygen is supplied to the lance head through an interior central duct formed by a tube 2. Around this tube 2 there are two tubes forming jackets 3 and 4 of a double wall construction through which coolant can be supplied and removed, to cool the lance during operation. A further description of these functions of the lance and the relevant constructional components can be dispensed with, since in this respect we are here dealing with a widely known and used water-cooled oxygen lance.

Figure 1:
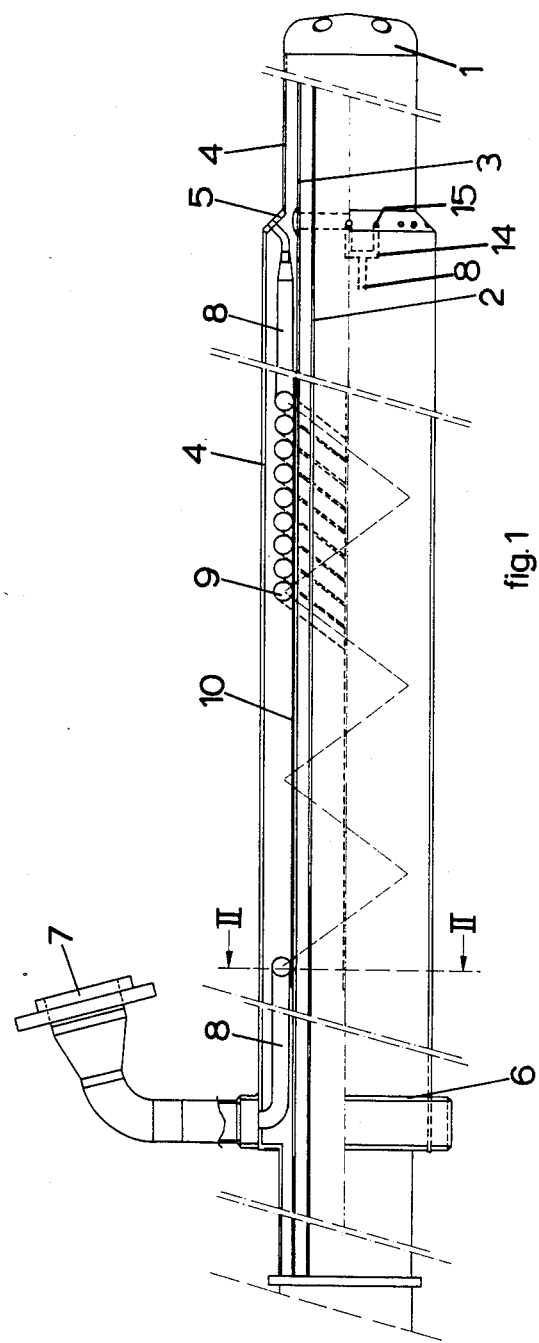
FIG. 1 shows a lance construction embodying the invention partly in side view and partly in longitudinal section.

In addition, the lance has a conical widening 5 in the outer jacket 4 at a distance 1 from the lance head 1, this distance in the case illustrated being about 0.4 times the intended lance-bath separation distance during the main decarburisation period of the steel bath. From this conical widening 5 the outer jacket 4 is cylindrical again until near the rear end of the lance. There it is connected to an annular channel 6 extending around the lance which is in turn connected via a conduit section to a coupling flange 7. The flange 7 is in use connected to a source of secondary oxygen, with a separate measurement and control circuit (not shown) from that for the primary oxygen. From the annular channel 6 eight tubes 8 extend first axially straight inside the outer jacket 4 and then, about half way along the lance, as bent tubes curving around the inner jacket 3 by in each case a few helical turns. These curved tubular pieces 9 then make a transition into respective further axial straight tubular pieces 8. Each of the latter eight tubular pieces 8 divides into two conduits 14 (see FIG. 1 and, in more detail, FIG. 3) which debouch at outlets 15 for the secondary oxygen located in the conical widening 5. With a spacing distance l of 600 mm between the outlets 15 and the primary oxygen outlets at the lance head 1, the outlets 15 each have a diameter of about 10 mm.

Ribs or ridges 10 extending axially are provided at a number of places around the circumference of the lance on the inner jacket for the support of the helically curved tubular pieces 9 on the inner jacket 3. FIG. 2 shows the lance in cross section on location II—II, where the transition from the straight upper tubular pieces 8 to the helically curved tubular pieces 9 can be seen, and it is clear from this how the tubular pieces 9 are held at a distance from the jacket 3 by the ridges 10. The coolant can thus freely flow around the tubular pieces 8 and 9 in the outer jacket. The presence of the helically wound tubular pieces 9 also prevent thermal stresses from arising in them.

FIG. 3 shows on a larger scale the conduits 14 in the form of bores in the conical widening part 5 which is made of pure copper. The tubes 8 are each coupled to two tapering tubes 12 via distributing ducts 11. The tubes 12 are in turn connected to bores 14 in the conical widening 5, which bores exit at an angle $\alpha$ with respect to the centre line of the lance at the outlets 15. In the case shown, $\alpha$ is chosen to be 45°. A thickening 13 on the tube wall 3 has the aim of exerting a favorable local effect on the flow of coolant when the lance is thermally expanded. Near the outlets 15 the bores 14 have the shape of Laval nozzles.

Figure 4:
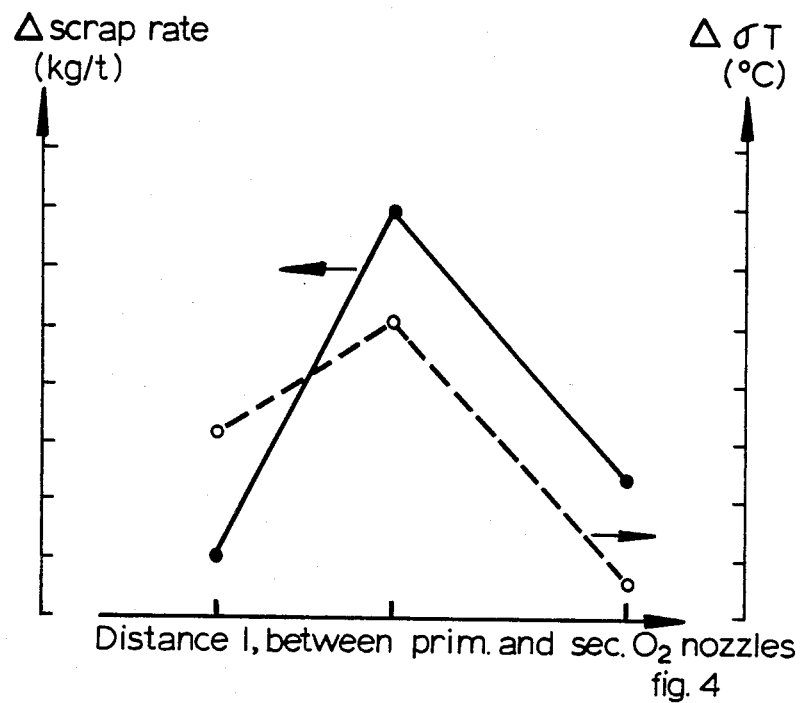
FIG. 4 illustrates graphically the relationship between the distance between the outlets for respectively primary and secondary oxygen and two process parameters.

FIG. 4 shows graphically the effect on (a) the scrap addition (scrap rate) and (b) the standard deviation ($\sigma T$) of the final blowing process temperature, of variation in the distance l between the outlets for the primary oxygen in the lance head 1 and the secondary outlets 15. The effect on the maximum possible scrap addition is given on the left-hand vertical scale and that on the standard deviation of the final temperature on the right hand vertical scale. Since we are concerned here to illustrate only the effect, no quantities are marked on the scales. Different actual quantities have been found depending on the dimensions of the converter and the various process conditions, but in each case a similar relationship was found. As may be seen from FIG. 4, a maximum value was found for the scrap addition for one particular distance between the primary and secondary oxygen outlets, but it also appears that the standard deviation of the final temperature reaches its highest value for the same configuration. This means that with this type of lance the most advantageous scrap addition can indeed be obtained, but this involves a sacrifice of accuracy in respect of the final bath temperature.

Figure 5:
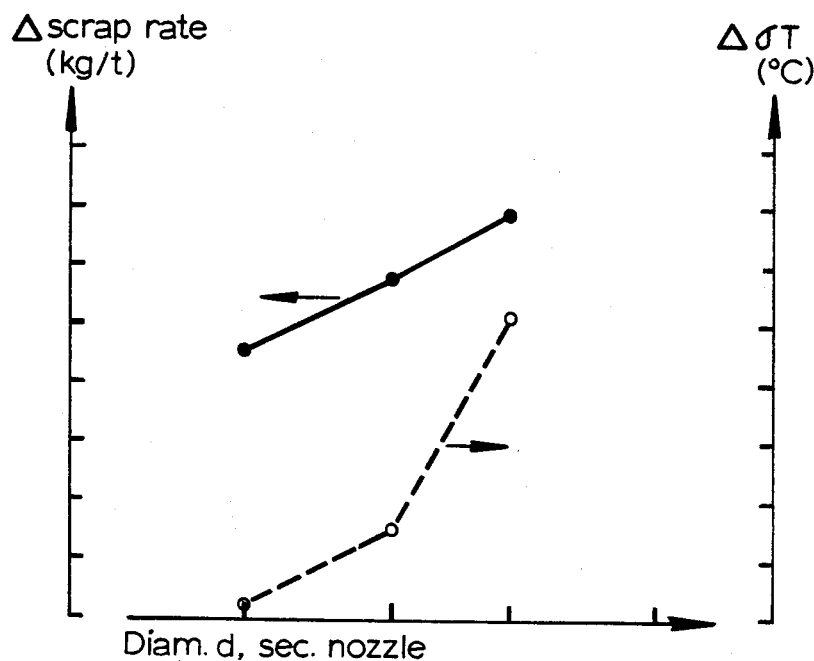
FIG. 5 illustrates graphically the relationship between the diameters of the secondary outlets and the same two process parameters.

In FIG. 5 the same quantities (a) scrap addition and (b) standard deviation of the final temeprature, are shown as a function of the diameter of the outlets 15. In this case, the distance between the primary outlets and the secondary outlets 15 is the distance at which in FIG. 4 optimal values of scrap addition and $\sigma T$ were found. It is noted that first a test was made for which the tubular pieces 8 were each connected to only one outlet 15. It appears from FIG. 5 that the final temperature control is significantly more accurate when diameter of the outlets is smaller. However at the same time the maximum scrap addition also falls somewhat, although to a lesser extent. In practice it has appeared that, when the diameter of the outlets 15 is less than 13 mm, and preferably is between about 8 and 11 mm, the final temperatures are fairly reproducible, while the scrap addition rate is only a little less than the maximum value illustrated in FIG. 4.

It has been found furthermore that this scrap addition can be improved further when each tube 8 feeds two outlets 15, as shown in FIG. 1. From FIG. 2, it can be seen that there are eight tubes 8, feeding in total sixteen outlets 15.

What is claimed is:

1. A liquid-cooled lance for blowing oxygen onto a bath of molten steel to increase the scrap production rate and temperature control, having a tip with at least one outlet from which a primary supply of oxygen is blown onto the bath, a central duct for the supply of the primary oxygen, a double tube system surrounding said central duct and for supply and removal of cooling fluid, a conical widening of the lance axially spaced from the tip, at least eight secondary outlets disposed around the lance in said conical widening for blowing a secondary supply of oxygen and a plurality of secondary supply ducts extending along the lance within the double tube system for supply of the secondary oxygen to the secondary outlets wherein said secondary oxygen outlets each have a diameter $d_s$ which satisfies the condition $d_s/l < 0.02$ where $l$ is the axial distance between the outlets for respectively the primary and secondary oxygen.

2. A lance according to claim 1 wherein there are more than twelve of said secondary outlets for each of which $d_s/d_k \leq 0.3$ where $d_k$ is the diameter of the narrowest outlet for the primary oxygen.

3. A lance according to claim 2 wherein there are 15 to 20 of said secondary outlets.

4. A lance according to claim 1 wherein each said secondary supply duct is connected to a plurality of said secondary outlets.

5. A lance according to claim 1 wherein each said secondary outlet has a nozzle shape which is at least generally the shape of a Laval nozzle.

6. A method of blowing oxygen onto a steel bath through a lance in a steel-making process during the main decarburization period of the steel bath comprising positioning the lance so that the axial distance between the outlets for respectively the primary and secondary oxygen is in the range 0.2 to 0.8 times the lance-bath surface spacing.

7. A method according to claim 6 wherein the distance is in the range 0.3 to 0.45 times the lance-bath surface spacing.

* * * * *